May 4, 1971　　　　E. C. BUCK　　　　3,577,303
TAPE APPLYING APPARATUS
Filed Nov. 18, 1968　　　　　　　　　　　　4 Sheets-Sheet 1
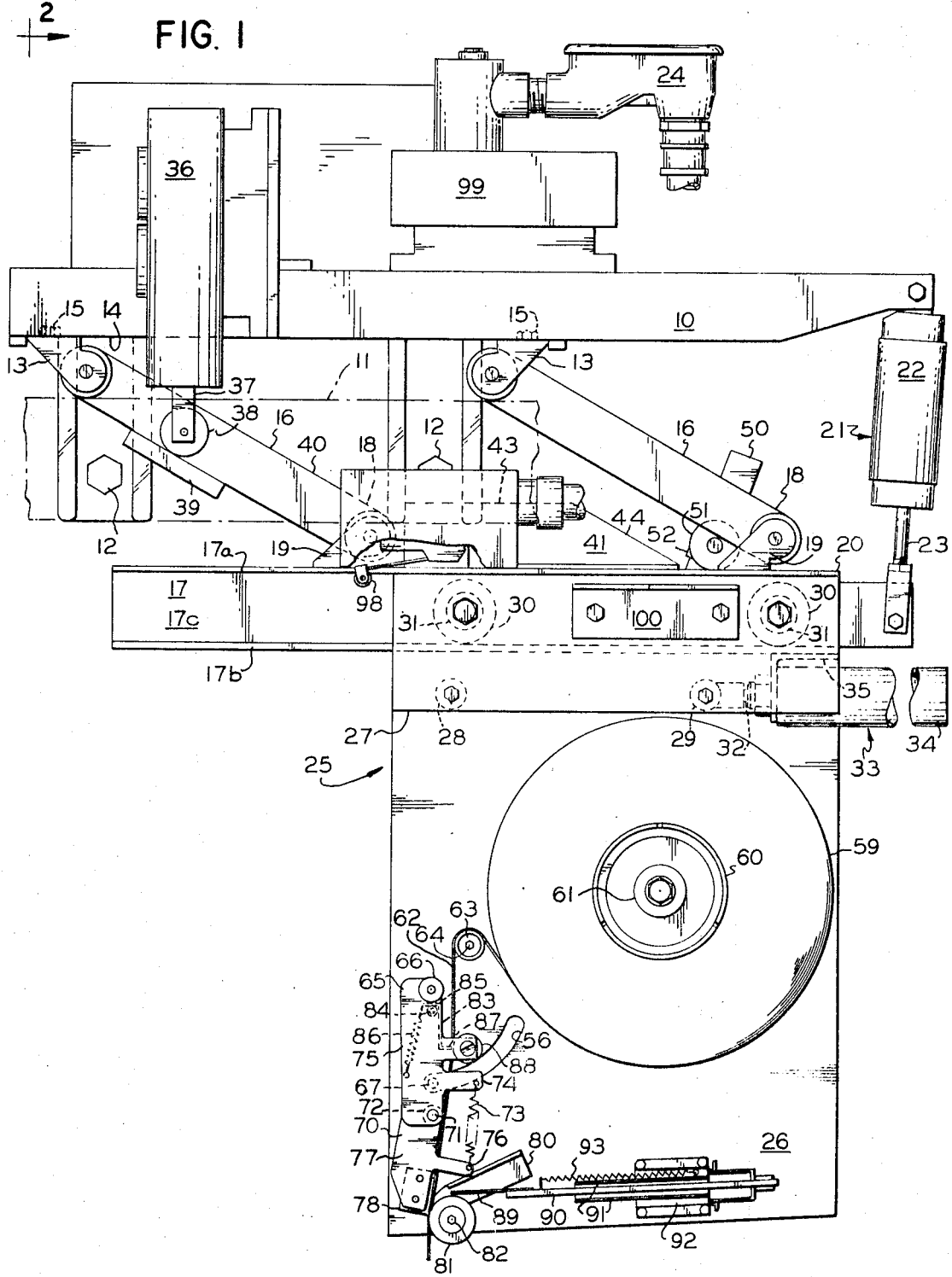
ERVILLE C. BUCK
INVENTOR
BY
BUCKHORN, BLORE, KLARQUIST & SPARKMAN
ATTORNEYS May 4, 1971 E. C. BUCK 3,577,303
TAPE APPLYING APPARATUS
Filed Nov. 18, 1968 4 Sheets-Sheet 2
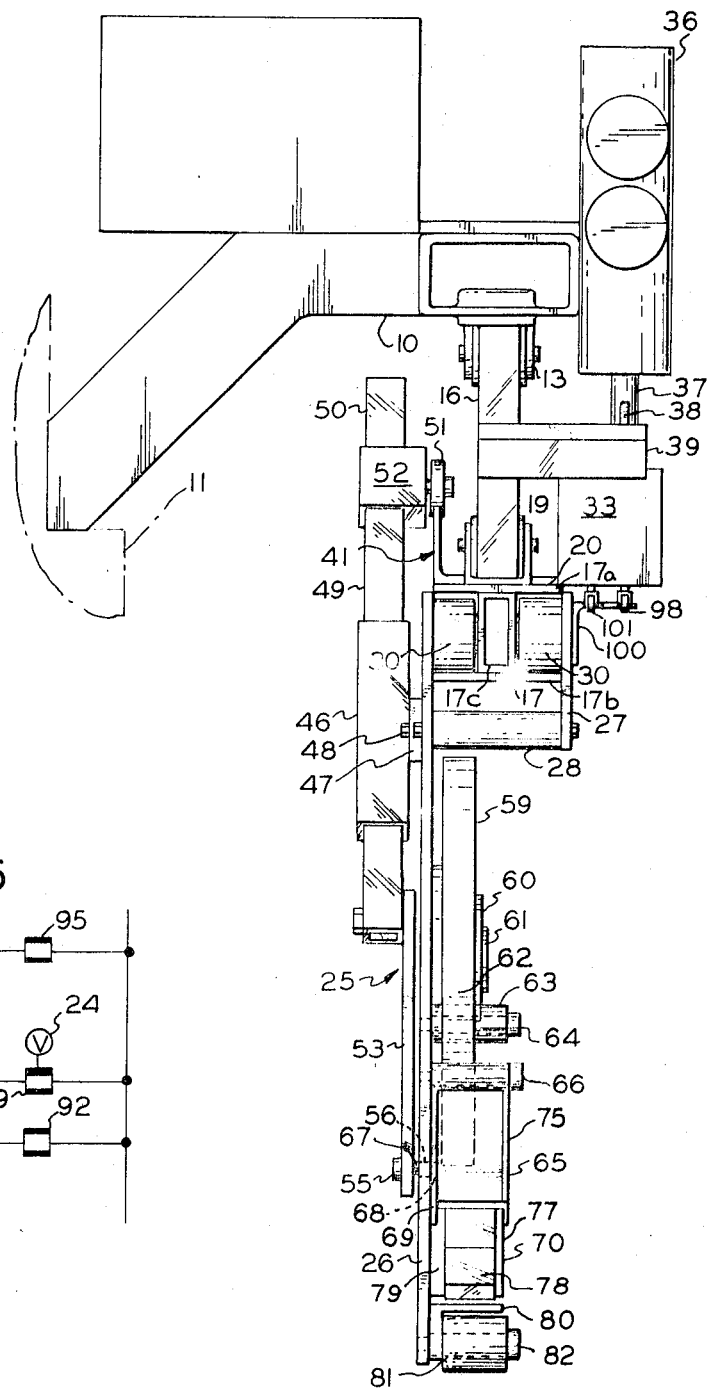
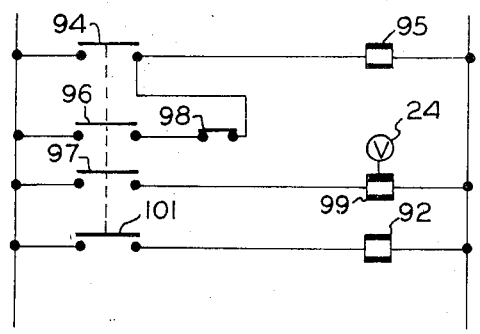
ERVILLE C. BUCK
INVENTOR
BY
BUCKHORN, BLORE, KLARQUIST & SPARKMAN
ATTORNEYS May 4, 1971
E. C. BUCK
3,577,303
TAPE APPLYING APPARATUS
Filed Nov. 18, 1968
4 Sheets-Sheet 3
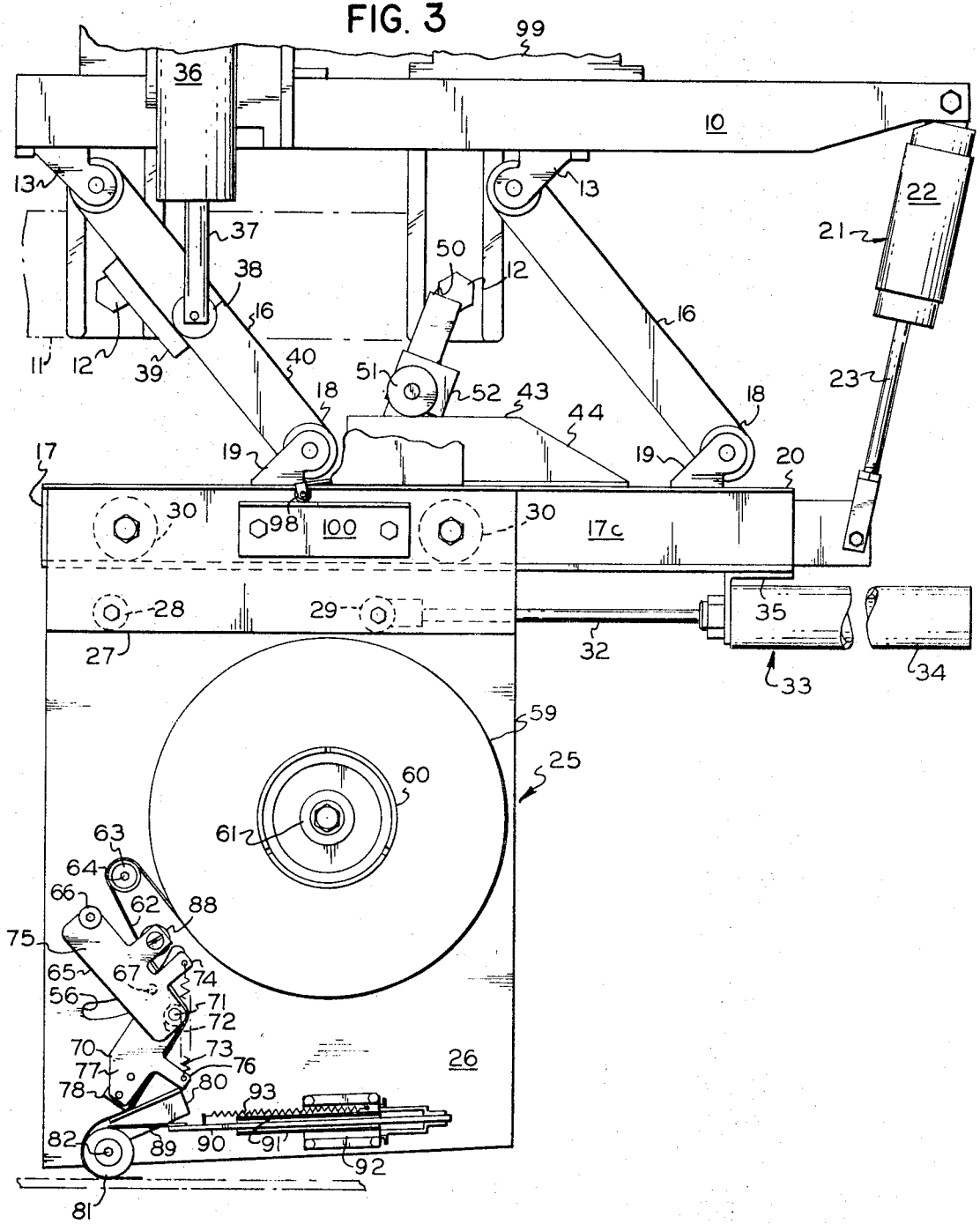
ERVILLE C. BUCK
INVENTOR
BY
BUCKHORN, BLORE, KLARQUIST & SPARKMAN
ATTORNEYS

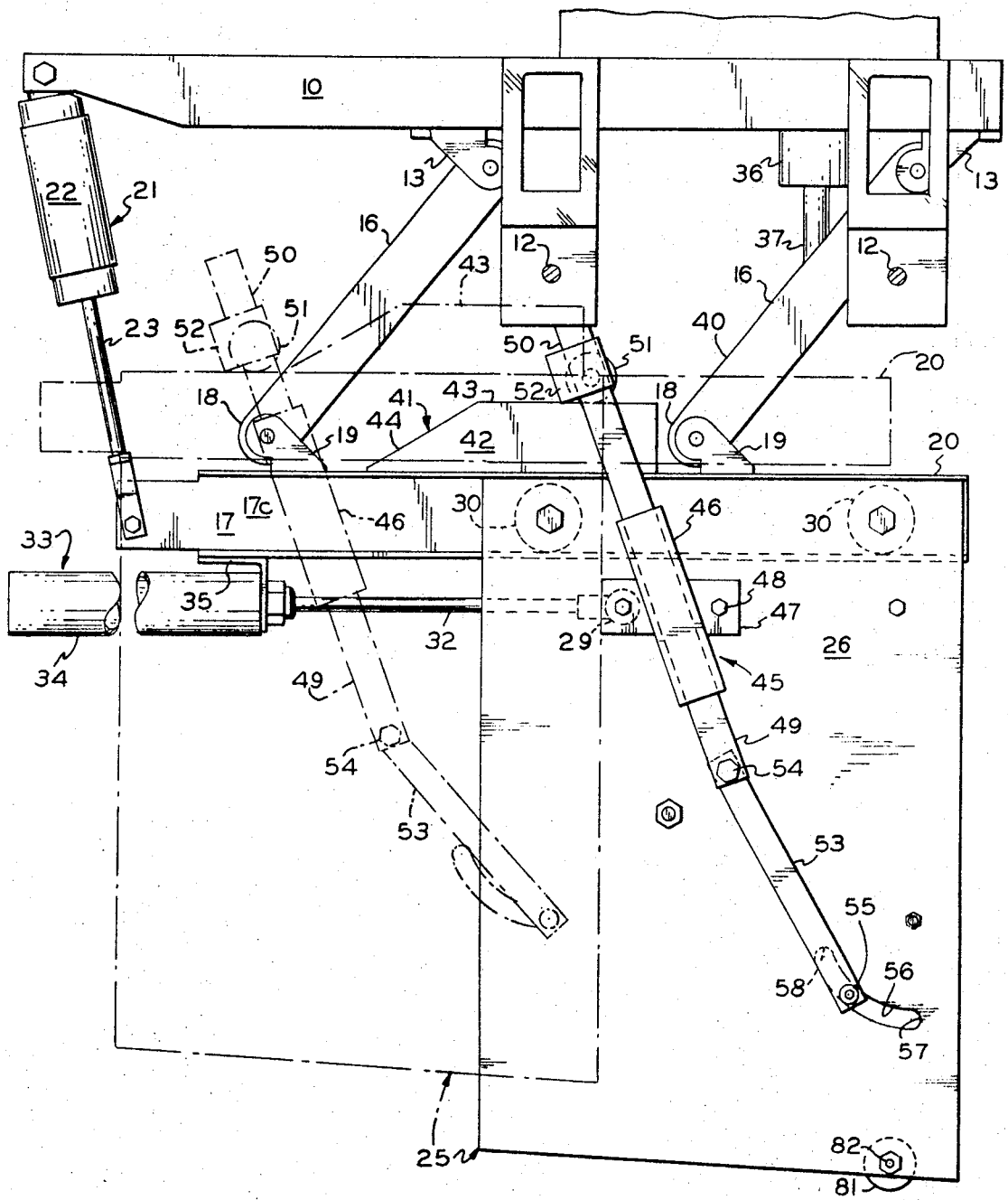

United States Patent Office
3,577,303
Patented May 4, 1971

3,577,303
TAPE APPLYING APPARATUS
Erville C. Buck, Springfield, Oreg., assignor to Willamette
   Valley Company, Eugene, Oreg.
Filed Nov. 18, 1968, Ser. No. 776,525
Int. Cl. B23b *31/18;* B44c *7/02*
U.S. Cl. 156—522                                11 Claims

ABSTRACT OF THE DISCLOSURE

An apparatus for applying a pressure-sensitive adhesive tape to a surface having a carriage means to support a supply of pressure-sensitive adhesive tape above the surface with a length of the tape hanging down, means to lower the carriage to a point at which the length of tape contacts the surface and adheres thereto, means to advance the carriage horizontally and apply a length of the tape to the surface and simultaneously withdraw a slight excess of tape from the supply, means to sever the tape at a point prior to the termination of the horizontal advance of the carriage, and means to return the carriage to its initial position with the excess tape hanging therebeneath.

BACKGROUND OF THE INVENTION

This invention relates to apparatus for applying a pressure-sensitive adhesive tape to a surface and, more particularly, to an apparatus adapted to apply such a tape to the surface of a wood veneer.

n the preparation of wood veneers for the making of plywood, it is often necessary to apply a short length of pressure-sensitive adhesive tape across a crack in the ply or across a veneer patch to hold it in place.

In the past this operation has been performed by hand. Such is time consuming and expensive. It is thus the primary object of the present invention to provide an apparatus for applying a pressure-sensitive tape to a surface of veneer quickly and efficiently.

SUMMARY OF THE INVENTION

The tape applying apparatus of the present invention comprises means to support a roll of pressure-sensitive adhesive tape above a surface to which the tape is to be applied. Mean are provided to lower the apparatus to bring a length of tape hanging below the apparatus into contact with the surface. Means are also provided to advance the apparatus horizontally to apply the tape to the surface and simultaneously withdraw an excess amount of tape from the supply roll. Means to sever the tape at a point prior to the termination of the horizontal advance of the apparatus are also provided, and finally means are provided to return the apparatus to its initial position with a short length of tape hanging therebeneath.

BRIEF DESCRIPTION OF THE DRAWINGS

FIG. 1 is a front elevational view of the tape applying apparatus of the present invention in the position it occupies at the beginning of its cycle.

FIG. 2 is a side elevational view of the apparatus of FIG. 1.

FIG. 3 is a front elevational view of the tape applying apparatus in the position it occupies at the termination of its tape applying stroke.

FIG. 4 is a rear elevational view of the apparatus in the position depicted in FIG. 3 with the FIG. 1 position in phantom.

FIG. 5 is an electrical diagram for the apparatus.

DESCRIPTION OF THE PREFERRED EMBODIMENT

Referring to the drawings and in particular to FIGS. 1–4, the tape applying apparatus of the present invention comprises a main mounting frame 10 attached to a support 11 by bolts 12. Two brackets 13 are attached to the lower surface 14 of the frame 10 by bolts 15. An arm 16 is pivotally attached to each bracket 13 and a track 17 is pivotally attached to the lower ends 18 of arms 16.

The track 17 comprises an upper plate 17a and a lower plate 17b spaced apart by a rectangular tube 17c, thereby to form a generally H-shaped section which is attached to the arms 16 by means of brackets 19 attached to the upper surface 20 thereof. (See FIG. 2) By this means the track 17 can be lowered and moved parallel to the frame 10.

Means are provided for lowering and raising the track 17 comprising a single acting air motor 21 having a cylinder 22 pivotally attached to one end of the frame 10 and a piston 23 pivotally attached to the corresponding end of the track 17. The cylinder 22 is connected to an air source (not shown) through a solenoid-operated, normally-open valve 24. The piston 23 is normally retracted within cylinder 22, thereby to keep track 17 normally elevated. Cutting the air supply to cylinder 22 permits the track 17 and the assembly it supports to move downwardly under the force of gravity.

A tape applying carriage 25 comprising a back plate 26 and a face plate 27 held apart by spacers 28 and 29 is adapted to travel on the track 17 by means of four wheels 30 journaled on bushings 31 cantilevered from the plates 26 and 27.

Means are provided to move the carriage 25 longitudinally on the track 17, such means comprising a double acting air motor 33 including a cylinder 34 suspended from track 17 by a bracket 35. The piston 32 of the motor 33 is connected to the carriage 25 through the spacer 29. The air supply to motor 33 is controlled by a four-way valve 36 mounted on the frame 10. The valve 36 has a downwardly-biased operating plunger 37 provided with a roller 38 on its lower end.

The roller 38 engages a pad 39 attached to the left one 40 of the arms 16 as they are viewed in FIG. 1. In the upper position of the track 17 and carriage 25, the valve 36 is positioned to pass air to the motor 33 to maintain the carriage at a position to the right as the apparatus is shown in FIG. 1. When the track 17 and carriage 25 lower, the valve plunger 37 extends and the valve 36 is operated to permit air to enter the cylinder 34 to cause extension of the piston 32, shifting the carriage 25 to the left.

A cam track 41 comprising an angle 42 having a vertical leg 43 cut at an angle to form a ramp 44 is mounted on the upper plate 17a of the track 17. A follower guide 45, comprising a sleeve 46 welded to a plate 47, is attached to the back of the plate 26 by bolts 48. A follower bar 49, at the top 50 of which a roller 51 is journaled from a cam follower bracket 52 attached to the bar 49, is adapted to slide within the sleeve 46. A follower arm 53 is pivotally attached to the lower end of the bar 49 by a shoulder bolt 54. Another shoulder bolt 55 is attached to the lower end of the arm 53 and is adapted to ride in an arcurate slot 56 cut in the plate 26. Movement of the carriage 25 from right to left along the track 17 as seen in FIG. 1 (or from left to right as seen in FIG. 4) thus causes the roller 51 to ride up the ramp 44 and then along the top of the leg 43 of the angle 42, pulling the bar 49 through the sleeve 46 and causing the arm 53 to draw the bolt 55 along the slot 56 from one end 57 to the other end 58 for a purpose to be hereinafter described.

Mounted on the plate 26 is a roll of masking tape 59. The tape roll 59 is supported on a reel 60 journaled on a bushing 61. Tape 62 from the roll 59 is led over a nylon roller 63 journaled on a shoulder bolt 64 also attached to the plate 26. An upper tape guide 65 of U-shaped cross section is pivotally attached at one end to the plate 26 by a bolt 66. A shoulder 67 on the bolt 55 on the end of arm 53 is received in an aperture 68 in a side plate 69 of the guide 65 such that motion of the bolt 55 in the slot 56 causes rotation of the guide 65 on the bolt 66.

A lower tape guide 70 is pivotally attached to the lower end of the upper tape guide 65 by a pivot 71 upon which a roller 72 is also mounted. A tension spring 73 is attached at one end to an arm 74 on the other side plate 75 of the guide 65 and at its other end to an arm 76 on a side plate 77 of the guide 70 for urging guide 70 counterclockwise about pivot 71 for a purpose to be described.

A feed block 78 is attached to the guide 70 at its lower end between its side plates 77 and 79. A tape guide 80 is attached to the plate 26 beneath the guide 70. The tape 62 passes between the block 78 and the guide 80, finally passing over a tape applying wheel 81 journaled on a bolt 82 received in plate 26. The roller 72 and the block 78 are preferably formed of urethane, so that the gummed tape surface will not adhere to them.

Brake means for stopping the flow of tape are provided on the upper tape guide 65. Such means comprise a Z-shaped tape brake 83 which pivots on a pin 84 supported between the legs 69 and 75 of the guide 65. One leg 85 of the brake 83 is attached to the guide 65 by a spring 86. The other leg 87 abuts against a stop 88. The tape 62 is thus seen to pass over the roller 63, between the leg 87 and the brake stop 88, over the roller 72, between the feed block 78 and the tape guide 80 and over the wheel 81 by which it is applied to the surface.

A knife 89 for severing the tape 62 is mounted on a bracket 90 for movement toward and away from the wheel 81. The knife slides between two guides 91 attached to the plate 26. Movement of the blade 89 toward the wheel 81 to sever the tape 62 is caused by energization of a solenoid 92. Return of the blade is effectuated by a spring 93.

Control of the apparatus is obtained through an electrical circuit shown diagrammatically in FIG. 5. The circuit contains a manually operable switch 94 which may, for example, be a foot switch which upon closure activates a relay 95 having normally open contacts 96, 97. Closure of the contacts 96 provides a holding circuit for the relay 95 through a normally closed limit switch 98. Closure of contacts 97 closes a circuit to the solenoid 99 of the valve 24 to cause said valve to close and cut off the air to the cylinder 22.

Limit switch 98 is mounted on the upper plate 17a of the track 17 and is adapted to be engaged and opened by a switch operating member 100 extending outwardly from the face plate 27 when the carriage 25 has reached the desired limit of its forward travel on the track 17.

The solenoid 92 for the knife 89 is adapted to be energized upon closure of a normally-open switch 101. Such switch is also mounted upon the track plate 17a and is likewise operated by the switch operating member 100 but at a time prior to the engagement of such operating member with switch 98.

OPERATION

The operation of the apparatus is as follows. When the operator steps on the foot switch 94, the relay 95 is activated to close relay contacts 96 and 97, thereby completing a holding circuit through limit switch 98 and operating valve 24 to cut off the air supply to the cylinder 22. The carriage 25 thus is permitted to move downwardly under the force of gravity until the tape applying wheel 81 contacts the surface to which tape is to be applied.

Lowering of the carriage 25 permits the operating plunger 37 of the valve 36 to extend downwardly and allow compressed air to enter the air motor 33 to advance the carriage 25. As the carriage 25 begins its movement on the track 17 (to the left as shown in FIG. 1), the end of the tape 62 which projected below the wheel 81 will be placed against the surface of the veneer so as to adhere to the veneer. Continued movement of the carriage 25 will thus cause a length of tape to be applied to the surface of the veneer. At a predetermined intermediate point of travel, the switch operating member 100 will trigger limit switch 101. This closes the circuit through the solenoid 92 causing the knife blade 89 to be projected to sever the tape 62. The carriage 25 continues to travel so that the severed end of the tape is rolled onto the veneer. The tape guide 80 prevents the tape from following the blade 89 as it is retracted.

As indicated earlier, means are provided to cause a sufficient amount of tape to be drawn from the roll 59 as to leave a short length extending beneath the tape applying wheel 81 for the start of the next tape applying operation. This is the result of the operation of the tape guides 65, 70 which will now be described.

As the carriage 25 moves from right to left (as shown in FIG. 1), the cam roller 51 is caused to ride up on the cam ramp 44 thereby causing the bolt 55 to be drawn upwardly in the slot 56 from the lower end 57 to the upper end 58 by reason of the construction previously described. At the beginning of a cycle, the upper tape guide 65 and lower tape guide 70 are in the linear relationship shown in FIG. 1. However, as the carriage 25 moves laterally and as the bolt 55 is moved upwardly in the slot 56, the guides 65, 70 pivot against the force exerted by spring 73 to the position shown in FIG. 3, the spring 73 urging the block 78 against the guide 80 so as to pinch the tape therebetween. This causes a length of tape 62 to be drawn from the roll 59 which length is greater than the distance between the upper end of the upper tape guide 65 and the tape applying wheel 81.

As indicated previously, the tape 62 is severed by the knife blade 89 prior to the time the carriage 25 reaches the end of its final stroke or pass, and this severing occurs while the tape guides 65, 70 are in their angular position. When the carriage is returned to its original position, the tape guides 65, 70 assume their original linear position relative to one another. The tape 62 adheres to the block 78 causing the end of the tape to be projected downwardly over the tape applying wheel 81 to extend therebeneath for the purposes hereinbefore described.

As the carriage 25 reaches the end of its travel on track 17, limit switch 98 is opened by the switch operating member 100. This breaks the circuit through the relay 95, causing switches 96, 97 to open and permitting valve 24 to return to its normal position. This permits air to enter the cylinder 22 to raise the piston 23 and thereby the carriage 25.

As the carriage 25 is elevated, the plunger 37 is urged upwardly by the pad 39, returning the valve 36 to its normal position and causing the piston 32 to retract into the cylinder 34. Such returns the carriage 25 to its original position as shown in FIG. 1.

In using the apparatus of the invention, a veneer to be patched is placed on a table beneath the apparatus and shifted so as to position a patch or crack beneath the stroke of the apparatus. The apparatus is then operated to apply the tape and the veneer is shifted to the next position. This can be done easily and quickly, and panels may be patched at much less expense than by any of the procedures heretofore utilized. Obviously the apparatus has utility in applying tape to other surfaces.

I claim:

1. Apparatus for applying a pressure-sensitive adhesive tape to a surface comprising
   a frame;
   a pair of arms pivotally attached to said frame;
   a track pivotally attached to said arms;
   a carriage adapted to travel on said track and support a supply of pressure-sensitive tape in a continuous strip above said surface with the end portion of said strip extending beneath said carriage;
   means attached to said frame and to said track for selectively lowering and raising said carriage parallel to said frame to bring said end portion of said strip into contact with said surface;

means to advance said carriage horizontally to apply a length of said tape to said surface;

means to sever said length of tape from said strip; and means to return said carriage to its initial position.

2. The apparatus of claim 1 in which said carriage advancing means comprise motor means attached to said track and to said carriage for moving said carriage longitudinally on said track.

3. The apparatus of claim 2 in which said motor means comprise an air motor, said air motor comprising an air cylinder attached to said track, a piston attached to said carriage, and means to supply air to said air cylinder to extend and retract said piston.

4. The apparatus of claim 1 further comprising first roller means on said carriage and over which first roller means said strip is trained;

surface engaging means mounted on said carriage beneath said first roller means for pressing said length of tape against said surface as said carriage advances horizontally;

guide means pivotally mounted on said carriage for swinging movement about a horizontal axis from a first position substantially parallel to the line extending between said first roller means and said surface engaging means to a second position extending across said line; and means for causing said guide means to swing from said first position to said second position as said carriage moves horizontally to apply said tape to said surface and thence to return to said first position as said carriage returns to its said initial position, whereby a length of tape is drawn from said supply, which length is greater than the distance between said first roller means and said surface engaging means, as said carriage applies said length of tape to said surface, the excess amount of said tape being adapted to extend beneath said carriage upon its return to said initial position for engagement with said surface upon the next operation of said apparatus.

5. Tape applying apparatus comprising a carriage, a roll of tape rotatably mounted on said carriage, a first roller mounted on said carriage and over which first roller tape from said roll is trained, a first tape guide pivotally attached at its upper end to said carriage, a second tape guide pivotally attached at its upper end to the lower end of said first tape guide, a second roller mounted at the point of attachment of said first and second tape guides and over which second roller said tape is trained, said second roller being positioned beneath said first roller, a tape applying wheel journaled on said carriage beneath said second roller and adapted to contact a surface upon lowering of said carriage, said tape being trained around said wheel, means to raise and lower said carriage, means to advance said carriage horizontally, and cam means adapted to pivot said first tape guide about its point of attachment to said carriage during horizontal advance of said carriage.

6. The apparatus of claim 5 further comprising spring means attached at one end to said first tape guide and at the other end to said second tape guide for urging said second tape guide counterclockwise with respect to said first tape guide.

7. The apparatus of claim 5 further comprising brake means on said first tape guide for stopping the withdrawing of tape from said roll, said brake means comprising a brake pivotally mounted on said first tape guide, a stop mounted on said carriage, said tape passing between said brake and said stop, and spring means urging said brake against said stop.

8. The apparatus of claim 5 in which said tape severing means comprise a knife mounted on said carriage, means to urge said knife toward said tape applying wheel prior to the termination of said horizontal advance of said carriage, and spring means to retract said knife following severing of said tape.

9. The apparatus of claim 5 further comprising a feed block attached to said second tape guide at its lower end and a third tape guide attached to said carriage beneath said second tape guide, said tape passing between said feed block and said third tape guide before being trained around said tape applying wheel, said tape being pinched between said second and third tape guides.

10. The apparatus of claim 5 in which said cam means comprise a ramp, a sleeve attached to said carriage, a follower bar received in said sleeve, a roller journaled at the top of said follower bar and adapted to ride up on said ramp and pull said bar through said sleeve, and means attached to the lower end of said follower bar and to said first tape guide to pivot said first tape guide about its said point of attachment to said carriage, thereby to pivot said second tape guide about its said point of attachment to said first tape guide.

11. Apparatus for applying a pressure-sensitive adhesive tape to a surface comprising a frame; a track; a carriage depending from and adapted to travel on said track; a pair of arms pivotally attached to the lower part of said frame and to the upper part of said track, a first air cylinder pivotally attached to said frame; a piston received in said first air cylinder and pivotally attached to said track; means to supply air to said first air cylinder to extend and retract said piston and thereby lower and raise said track and carriage parallel to said frame; a second air cylinder attached to said track; a second piston received in said second air cylinder and attached to said carriage; means to supply air to said second air cylinder to extend and retract said second piston to move said carriage longitudinally on said track; a roll of tape rotatably mounted on said carriage; a first roller mounted on said carriage and over which first roller tape from said tape roll is trained; a first tape guide pivotally attached at its upper end to said carriage; a second tape guide pivotally attached at its upper end to the lower end of said first tape guide; a second roller mounted at the point of attachment of said first and second tape guides and over which second roller said tape is trained, said second roller being positioned beneath said first roller; a tape applying wheel journaled on said carriage beneath said second roller and adapted to contact said surface upon lowering of said track and carriage, said tape being trained around said wheel; a ramp mounted on said track; a sleeve attached to said carriage; a follower bar received in said sleeve; a roller journaled at the top of said follower bar and adapted to ride up on said ramp and pull said bar through said sleeve; means attached to the lower end of said follower bar and to said first tape guide to pivot said first tape guide about its point of attachment to said carriage, thereby to pivot said second tape guide about its point of attachment to said first tape guide during horizontal advance of said carriage on said track and draw a length of tape from said tape roll greater than the linear distance between said first roller and said tape applying wheel; brake means on said first tape guide for stopping the withdrawing of tape from said roll, said brake means comprising a brake pivotally mounted on said first tape guide, a stop mounted on said carriage, said tape passing between said brake and said stop, and spring means urging said brake against said stop; tape severing means comprising a knife mounted on said carriage, means to urge said knife toward said tape applying wheel prior to the termination of said horizontal advance of said carriage on said track, and spring means to retract said knife following severing of said tape; a feed block attached to said second tape guide at its lower end; a third tape guide attached to said carriage beneath said second tape guide, said tape passing between said feed block and said third tape guide before being trained around said tape applying wheel; spring means attached at one end to said first tape guide and at the other end to said second tape guide to urge said second guide counterclockwise with respect to said first tape guide and against said third guide; said third tape guide preventing said tape from following said knife as said knife is retracted by said knife-retracting spring means; and means to return said carriage to its initial position on said track, said length of tape drawn from said roll comprising an excess of tape to hang beneath said tape applying wheel upon said return of said carriage to said initial position on said track.

References Cited

UNITED STATES PATENTS

| | | | |
|---|---|---|---|
| 3,066,723 | 12/1962 | Remington et al. | 156—522 |
| 3,206,911 | 9/1965 | Carle et al. | 156—522X |

SAMUEL FEINBERG, Primary Examiner

J. M. HANLEY, Assistant Examiner

U.S. Cl. X.R.

156—269, 576, 526